April 13, 1926.
A. JABS
1,580,603
SHAFT PACKING
Filed March 17, 1922  2 Sheets-Sheet 1
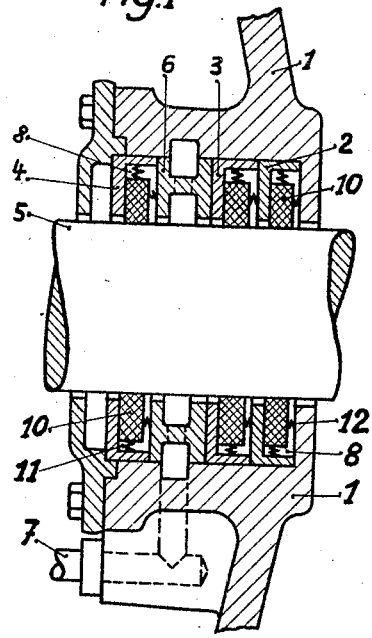
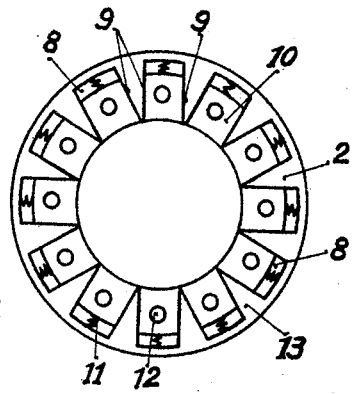
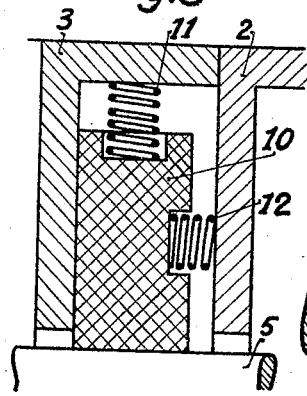
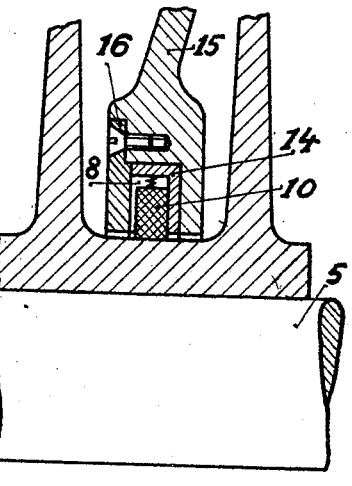
Inventor:
Asmus Jabs,
By
Atty.

April 13, 1926.

A. JABS 1,580,603

SHAFT PACKING

Filed March 17, 1922    2 Sheets-Sheet 2

Inventor:
Asmus Jabs,
By Henry Orth Jr
Atty.

Patented Apr. 13, 1926.

1,580,603

UNITED STATES PATENT OFFICE.

ASMUS JABS, OF ZURICH, SWITZERLAND, ASSIGNOR TO THE FIRM AKTIENGESELLSCHAFT DER MASCHINENFABRIKEN ESCHER WYSS & CIE., OF ZURICH, SWITZERLAND.

SHAFT PACKING.

Application filed March 17, 1922. Serial No. 544,563.

*To all whom it may concern:*

Be it known that I, ASMUS JABS, a citizen of the Republic of Germany, residing at Zurich, Switzerland, have invented certain new and useful Improvements in Shaft Packings, of which the following is a specification, reference being had therein to the accompanying drawing.

The object of the present invention is a stuffing box for shafts, journals and similar machinery parts.

Stuffing boxes with packing or tightening rings concentrically embracing and packing a machine part and which consist of several segments held together by spring pressure present the disadvantage that too great an expansion of the machine part causes a damage to the packing rings or leads to a destruction of said rings. Further, with stuffing boxes having large diameters, the weight of the rings is so great that either wear of the machine part is caused thereby at the spot on which the ring bears or the rings are worn out by the rod so that too large a clearance is formed. Moreover, separate supporting springs must be provided to maintain the ring segments in concentric position with regard to the machine part in order that when starting up the machine or when the latter runs under partial load no losses due to leakage result in consequence of an unequal distribution of the clearance between the packing rings and the machine part to be packed. In order to overcome these drawbacks it has already been proposed to provide a member concentrically surrounding the part to be packed with radially arranged recesses and to insert into the latter movable packing elements. These packing elements which are separated from each other by parts confining the recesses of said member are each influenced by a spring that tends to urge said elements inwardly in the radial direction towards the part to be packed, whereby said packing elements come in contact with each other at the spot to be packed. With this arrangement the force by which the packing elements are pressed against the machine part to be packed solely depends on the action of the springs causing said radial pressure. The spring pressure in its turn depends on the temperatures present inside the stuffing box owing to variations in the dimensions of the spring caused by temperature variations. This temperature is for instance in a stuffing box for steam turbines substantially different when the turbine is standing still and when same is normally working. In consequence thereof the packing elements are at one time urged too strongly and at another time too weakly against the machinery part to be packed so that also with these stuffing boxes wear of the parts coacting with each other occurs as well as losses due to leakage.

In order to attain with stuffing boxes of the last mentioned type under all circumstances a proper pressing of the packing elements against the machine part to be packed, said elements, which are continuously urged by springs acting in the radial and in the axial direction to bear against the machine part to be packed and against packing faces of the recesses, are during the working according to the present invention principally under the influence of the medium against which the packing has to be effected; the spring pressures being so chosen that during the working these pressures compounded with the pressures resulting from the medium and the frictional forces give a resultant force on each element gently urging the element in the radial direction against the part coacting with the stuffing box.

In order to obtain small specific pressures in the cases in which the medium to be packed against has a high pressure and the number of the packing elements is small the faces of said elements and of the packing ring in which said elements are inserted and which faces are brought to coact with each other by the action of the forces in the axial direction on said packing elements during the working, may be arranged obliquely to the longitudinal axis of the machinery part, whereby the oblique face of the packing element causes the generation of a component force, that lessens the forces urging the element in a radial direction against the machine part to be packed and thus secures a gentle pressing of the element against said part.

Constructional examples of the object of the invention are shown in the accompanying drawings, in which:

Fig. 1 is a vertical longitudinal section through a stuffing box having separating or packing rings surrounding a shaft;

Fig. 2 is an end view seen from the right hand side of Fig. 1 of such a ring and of the packing elements arranged in recesses of the latter;

Fig. 3 illustrates details of the stuffing box on a larger scale;

Fig. 4 is a vertical longitudinal section through part of a stuffing box used for packing a partition wall of a steam turbine;

Figure 5:
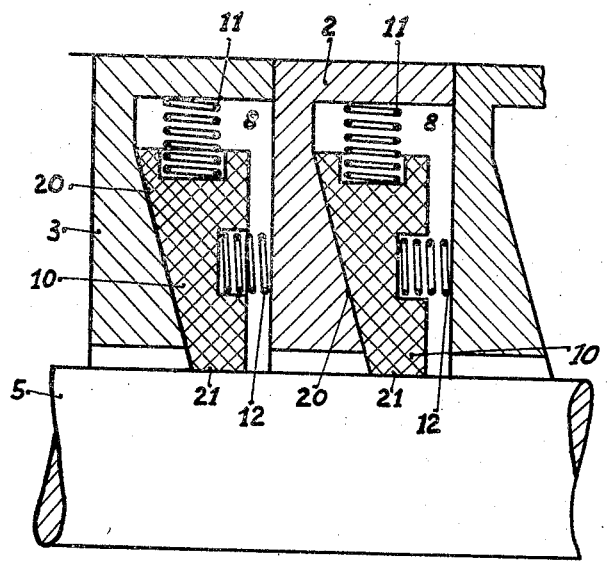
Fig. 5 is a vertical longitudinal section through part of a stuffing box the packing elements of which are each provided with an oblique face and Fig. 6 shows a modified arrangement of spring.

Referring to the constructional form illustrated in Figs. 1—3, in a casing 1 separating or packing cages or rings 2, 3 and 4 are arranged, which surround a shaft 5 with clearance. 6 denotes an intermediate ring interposed between the packing cages 3 and 4, and 7 indicates a conduit that serves either for leading off the leaking steam (when packing against over-pressure), or for supplying steam preventing the entrance of air (when packing against vacuum). Each of the cages 2, 3, 4 is provided with a number of recesses 8 radially disposed with regard to the axis of the shaft 5. One of the planes of symmetry of each recess 8 passes through the axis of the shaft 5 and the two planes 9 (Fig. 2) confining each recess 8 laterally are parallel to that plane of symmetry.

In the recesses 8 packing elements 10 are inserted which can move relatively to the recesses in the radial as well as in the axial direction. Each element 10 is influenced by a spring 11 acting in the radial direction and by a spring 12 acting in the axial direction. The packing elements 10 inserted in the radially disposed recesses 8 of the partition rings are separated from each other by the V-shaped parts 13 (Fig. 2) which confine the recesses 8.

The elements 10 are during the working principally under the influence of the medium against which packing has to be done. The spring pressures acting in the radial and axial direction are so chosen that under working conditions the spring pressures compounded with the steam pressures and the frictional forces give a resultant force that urges the element 10 gently in the radial direction against the shaft 5. The radially disposed elements of one group thus come in contact with each other at their inner edges so that they form there substantially one continuous cylindrical packing face. The springs 11 and 12 have mainly the task of auxiliary means which above all when starting up have to ensure that the elements bear against the shaft 5 and against the tightening faces of the rings 2, 3, 4. During the normal working the steam pressure acting upon the elements 10 mainly presses them against the tightening faces. By suitably chosing the spring pressures the elements 10 are prevented from being urged with undue pressure against the shaft 5 so that a damaging of said parts is prevented whilst on the other hand a yielding of the elements 10 in the radial direction is possible in case the shaft 5 expands or when shocks occur.

The parallel walls 9 afford a proper guidance of the elements moving in the radial direction; and the walls 9 permit also the moving of the elements inwardly in the radial direction when wear takes place.

With the constructional example illustrated in Fig. 4 only one ring 14 having one group of recesses 8 radially disposed about the axis of the shaft 5 is provided for taking up the packing elements 10. The ring 14 is held in position by means of a ring 16 rigidly connected to the guide wheel 15 which is only partly shown in the drawing. On each element 10 spring pressure acts in the radial and in the axial direction. The working of this stuffing box corresponds to that described above.

In Fig. 5 the parts which correspond to those illustrated in Fig. 1 are marked with the same reference numbers as in Fig. 1. The packing rings 2, 3 surround the shaft 5 with clearance, and each of said packing rings is provided with a number of recesses 8 radially disposed with regard to the axis of the shaft 5, this arrangement being not shown again in a special figure. Each of the packing elements 10 is influenced by a spring 11 acting in the radial direction and by a spring 12 acting in the axial direction. The faces 20 of the elements 10 and of the packing rings 2, 3 that coact with each other by reason of the forces acting in the axial direction upon the packing elements during the working, are arranged flat and inclined to the longitudinal axis of the machine part. As has been found by calculation, these faces 20 cause the generation of a component force acting in a radial outward direction as soon as the packing elements 10 are influenced by the pressure exerted by the medium to be tightened against, which pressure tends to urge the elements in a radial inward direction. The magnitude of the component acting in the radial outward direction is amongst other facts dependent upon the angle of inclination of the faces 20, so that by suitably choosing the inclination of said faces the forces acting in the radial inward direction can be counterbalanced by the component acting in the radial outward direction. In this manner it is possible to prevent the generation of too great specific pressures at the faces 21 of the packing elements 20.

The packing elements may consist of carbon, metal and any other suitable material.

Figure 6:
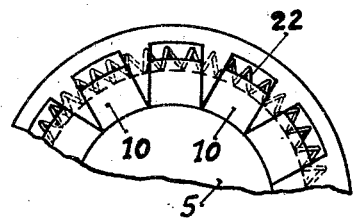

Instead of the single springs 11 only one spring 22 concentrically arranged to the shaft 5 might be provided for all the elements 10 of one group (Fig. 6). In certain cases the springs 12 can be dispensed with.

The stuffing box above described may also be utilized in connection with journals and similar machine parts and is adapted to work against a pressure above and below the atmosphere.

Further it may be observed that the members surrounding the shaft 5 and taking up the elements 10, i. e. the rings 2, 3, 4 and 14 in the constructional examples illustrated, may have any shape and it does not matter in which particular part of said members the recesses 8 are arranged.

I claim:

1. A shaft packing comprising a packing cage having a plurality of recesses arranged radially in the same plane, a packing element in each recess capable of radial movement therein, means to positively admit leakage medium to said recesses for action on two faces of an element that are at an angle to each other, whereby each packing element is radially movable in its recess and incapable of affecting or causing the movement of its adjacent element.

2. A shaft packing comprising a cage ring having a plurality of recesses arranged radially in the same plane, packing elements in said recesses each capable of radial movement therein and each element having a front end surface and a peripheral pressure face, means to positively admit leaking medium to said recesses for action on said end surface and pressure face to simultaneously urge each element toward the shaft and against one side of its recess, and resilient means acting on the elements.

3. A shaft packing comprising at least one packing cage having a plurality of recesses arranged radially in the same plane, packing elements in the recesses capable of radial movement therein, and each element having two faces at an angle to one another for action thereon by leakage medium, means to positively admit leakage medium to said recesses and faces, and a spring acting on each face of each element acted upon by said medium and supplemented by the pressure of said medium.

4. A shaft packing comprising a cage ring having a plurality of recesses radially arranged in a plane and L-shaped in radial section through the recesses, a packing element in each recess of less width than the ring and shorter than its recess, thereby forming a chamber at two unguided faces of each element, and means to admit leakage medium to said chamber for action on said unguided faces of the element.

5. A shaft packing comprising a cage ring having a plurality of recesses radially arranged in a plane, packing elements in the recesses having two walls substantially at right angles to each other, and an inclined wall cooperating with a similar radial wall of the recesses, means to positively admit leakage fluid to said two walls to simultaneously urge each element against the shaft and against the inclined wall of its recess.

6. A shaft packing comprising a cage ring surrounding the shaft with clearance, a plurality of recesses radially arranged in the plane of said ring, a packing element in each recess narrower and shorter than the recess and forming a chamber at two unguided faces of the element, springs acting on at least one of the unguided faces of each element, means to positively admit leakage medium to said recesses for action on the unguided faces of the elements to simultaneously urge each element against the shaft and against a side of the ring to close the clearance thereat.

In testimony that I claim the foregoing as my invention, I have signed my name.

ASMUS JABS.